United States Patent
Kenington

(10) Patent No.: US 8,036,606 B2
(45) Date of Patent: Oct. 11, 2011

(54) METHOD AND APPARATUS FOR INTERFERENCE CANCELLATION

(75) Inventor: Peter Kenington, Devauden (GB)

(73) Assignee: Ubidyne, Inc., Wilmington, DE (US)

( * ) Notice: Subject to any disclaimer, the term of this patent is extended or adjusted under 35 U.S.C. 154(b) by 410 days.

(21) Appl. No.: 12/364,662

(22) Filed: Feb. 3, 2009

(65) Prior Publication Data

US 2010/0197231 A1    Aug. 5, 2010

(51) Int. Cl.
    H04B 1/44    (2006.01)
(52) U.S. Cl. .......................................... 455/78
(58) Field of Classification Search ................. 455/63.1, 455/78, 296, 570
    See application file for complete search history.

(56) References Cited

U.S. PATENT DOCUMENTS

| | | | |
|---|---|---|---|
| 6,229,992 B1 | 5/2001 | McGeehan et al. | |
| 6,507,728 B1 | 1/2003 | Watanabe et al. | |
| 6,510,308 B1 | 1/2003 | Thomas et al. | |
| 7,330,500 B2 * | 2/2008 | Kouki | 375/219 |
| 7,492,812 B2 * | 2/2009 | Ninomiya et al. | 375/219 |
| 2003/0020651 A1 | 1/2003 | Crilly, Jr. et al. | |
| 2005/0030884 A1 | 2/2005 | Kim et al. | |
| 2005/0135283 A1 | 6/2005 | Chan | |
| 2006/0178157 A1 | 8/2006 | Gebara et al. | |
| 2006/0226353 A1 | 10/2006 | Tang et al. | |
| 2006/0291598 A1 | 12/2006 | Gebara et al. | |
| 2007/0060059 A1 | 3/2007 | Kim et al. | |
| 2007/0217488 A1 | 9/2007 | Smaini et al. | |
| 2007/0253495 A1 | 11/2007 | Kim | |
| 2008/0146183 A1 | 6/2008 | Gebara et al. | |

FOREIGN PATENT DOCUMENTS

| | | |
|---|---|---|
| EP | 1835630 | 9/2007 |
| WO | 2007/013900 | 2/2007 |

OTHER PUBLICATIONS

Peter Kenington, "RF and Baseband Techniques for Software Defined Radio", 2005, Chapter 4, Artech House, ISBN: 1-58053-793-6, pp. 142-158.

* cited by examiner

*Primary Examiner* — Jeffrey Zweizig
(74) *Attorney, Agent, or Firm* — Stephen H. Eland; Dann, Dorfman, Herrell & Skillman

(57) ABSTRACT

An interference canceller between a transmit chain and a receive chain of a transceiver is proposed to complement the action of a diplexer, or duplex filter, that is part of the transceiver. The interference canceller comprises a transmit chain tap, a receive chain coupler for coupling an interference compensation signal into the receive chain, and an interference signal processing path between the transmit chain tap and the receive chain coupler. The interference signal processing path comprises a filter having filtering characteristics similar or corresponding to the filtering characteristic of a receive portion of said diplexer. A corresponding method for interference cancellation is also proposed. Computer-program products for the manufacture of the interference canceller and the execution of the method are also proposed.

18 Claims, 7 Drawing Sheets

METHOD AND APPARATUS FOR INTERFERENCE CANCELLATION

FIELD OF THE INVENTION

The application relates to an interference canceller in a radio transceiver. The application also relates to a method for interference cancellation in a radio transceiver.

The application further relates to a computer program product enabling a processor to carry out the method for interference cancellation and to a computer program product useable for the manufacture of the interference canceller. Moreover, the invention relates to an antenna array comprising an interference canceller.

BACKGROUND OF THE INVENTION

Transceivers for radio communication that use the same antenna for transmission and for reception of radio signals often require a diplexer, or duplex filter. This is particularly true when the transceiver uses a frequency-division duplex scheme, i.e. the transmit and receive bands are at different frequencies.

Duplex filters are often large and expensive because of their high performance requirements. For antenna arrays having several individual antenna elements and a corresponding number of transceivers, the cost and space requirements for the duplex filters are significant. A typical antenna array may require 16 duplex filters, the performance requirements of which are similar to that required of the filter in a full-power remote radio head (for example) with the main exception of its power handling. The realization of a duplex filter, for an acceptable size and cost, has the potential of making the flexibility of active antenna arrays available at competitive prices.

Especially in the case of handsets, a different approach has become popular over the last years: vector cancellation has been proposed for eliminating the diplexer, for example in chapter 4 of "RF and Baseband Techniques for Software Defined Radio" by Peter Kenington, Artech House, 2005, ISBN: 1-58053-793-6. Vector cancellation has also been proposed for interference cancellation (again, largely within handsets)—for example, removal of GPS local oscillator interference from a cellular handset receive chain (in a handset with GPS capability). Vector cancellation has also been proposed for Tx/Rx isolation enhancement in repeater system.

The international patent application WO 2007/013900 A2, entitled "Method and system for automatic control in an interference cancellation device" proposes a signal processing circuit that can generate an interference cancellation signal that, when applied to the victim communications channel, cancels the detrimental interference. The signal processing circuit can dynamically adjust or update two or more aspects of the interference cancellation signal, such as an amplitude or gain parameter and a phase or delay parameter. A filter in the signal processing circuit models the channel coupling. However, the behaviour of the filter is not similar or identical to that of the receive portion of the duplex filter.

SUMMARY OF THE INVENTION

It would be desirable to be able to reduce the performance requirements for a diplexer in a transceiver. To better address this concern and/or other concerns, in a first aspect of what is taught herein, an interference canceller between a transmit chain and a receive chain of a transceiver is proposed. The transceiver comprises a diplexer between the transmit chain and the receive chain. The interference canceller comprises a transmit chain tap, a receive chain coupler for coupling an interference compensation signal into the receive chain, and an interference signal processing path between the transmit chain tap and the receive chain coupler. The interference signal processing path comprises a filter having filter characteristics similar or corresponding to the filtering characteristics of a receive portion of the diplexer. The use of transmit signal cancellation in the receive path of a transceiver allows reducing the performance required of the diplexer filter, rather than eliminating the need for a diplexer filter altogether. The action of the diplexer and the active interference cancellation provided by the interference canceller supplement each other. Compared to previous solutions, the diplexer can be of reduced cost and reduced size and causes less insertion loss. The ability to use a simpler filter widens the technology choices available for the fabrication of the diplexer.

The diplexer, or duplex filter, separates the transmit and receive bands in the frequency-division duplex scheme for which the unit is designed. The filter of the interference canceller may be a bandpass filter, a high-pass filter, or a low-pass filter. The filter has filtering characteristics that are similar or corresponding to the filtering characteristics of the receive portion of the diplexer. This choice ensures that only (or largely) the transmitter noise falling into the receive band is passed to the receive chain coupler; this differs from previous solutions in which the aim is to remove the main transmit signal energy, not just the portion of the transmitter's energy appearing in the receive band. Such solutions attempt to improve the receiver's blocking performance, by reducing the amount of the high-power transmit signal appearing in the receive band, which de-senses (or 'blocks') the receiver when it attempts to receive weak signals. In the present invention, however, the aim is to improve the receiver's noise figure by removing the contribution of the transmitter's noise and intermodulation distortion which falls into the receive band. Furthermore, the filter of the interference canceller has a similar influence on the transmitter noise than the receive portion of the diplexer. It would be desirable that the signal coupled to the receive chain is an anti-phase cancelling signal such that vector cancellation of the transmit noise and intermodulation distortion occurs in the receive chain coupler.

The proposed solution attempts to reduce the performance required from a diplexer, not eliminate it altogether. The proposed solution removes the transmit noise and intermodulation distortion (IMD) which falls into the receive band and not the main transmit signal itself (although this may also be reduced, co-incidentally).

It would be further desirable to achieve good interference cancellation in the frequency of the receiver. In order to better address this concern, the transmit chain may be configured to be operable at a transmit frequency band defined by a transmit channel, and the filtering characteristic of the filter may allow transmission of transmission noise falling in a frequency band outside the transmit channel. For most applications it is sufficient to cancel the interference that is perceived as noise in the receive band. It is often not necessary to cancel the entire transmit signal from within the receive chain. The reason is that signals at frequencies that are farther away from the receive frequency are attenuated anyway by regular receive chain processing. On the other hand, interference signals that fall within the receive frequency band are usually a bigger problem. By allowing the transmission of noise falling in the frequency band outside the transmit channel (and thus possibly into the receive channel) it is possible to concentrate cancellation efforts on highly interfering signal components.

It would further be desirable that the interference compensation signal matches the interfering signal in the receive chain in phase and amplitude. In order to better address this concern, the interference signal processing path may comprise a vector modulator or a variable attenuator and a variable phase shifter. By means of a vector modulator, the interference compensation signal can be adjusted in phase and amplitude. A vector modulator provides good control over the phase of the signal, because the phase can be adjusted over 360 degrees. The combination of a variable attenuator and a variable phase shifter provide similar capabilities.

It would also be desirable to adapt the amount of phase shift, amplitude attenuation or vector components to varying conditions. In order to better address this concern, the interference canceller may comprise a control signal processor that is arranged to determine control signals for the vector modulator or the variable attenuator and the variable phase shifter. A control signal processor is capable of analyzing the performance of the cancellation process and of determining control parameters that lead to optimized performance of the cancellation process.

It would be further desirable to determine the amount of coherence between the transmitted signal and the signal on the receive chain. The less coherent the signals are, the better the interference cancellation performs. In other words: if the transmit signal is not (or to a very limited extend only) detectable in the received signal, then the interference cancellation is successful. In order to address this concern, the control signal processor may comprise a quadrature correlator arranged to receive a signal on the transmit chain and a signal on the receive chain of the transceiver. The quadrature correlator may produce a signal that represents the similarity of the two input signals, here the transmit signal and the signal on the receive chain.

It would be further desirable to directly correlate the transmit noise/IMD falling in the receive band with 'uncorrupted' transmit noise/IMD, instead of relying on the correlation of the main transmit signal itself. In order to address this concern, the interference canceller may further comprise a feedback path between the interference signal processing path and the control signal processor for providing the interference compensation signal to the control signal processor. This architecture does not rely on the assumption that the main transmit signal is well correlated with the noise/IMD (despite the deformation of both by the duplex filter), because a separate down conversion chain or feedback path, purely for the receive band transmit noise/IMD is used.

It would also be desirable to be able to generate the required transmit IMD reference signal (but not the noise) in the control signal processor. In order to address this concern, the control signal processor may comprise a transmit chain non-linearity model and an equivalent receive band filter. The signal on the transmit chain is applied to the transmit chain non-linearity model. This structure removes the need for an added down conversion chain, but relies on the accurate generation and filtering of an appropriate IMD signal.

It would be further desirable that the interference compensation signal successively approaches the actual interference signal, thus leading to good long-term interference cancellation performance. In order to address this concern, the control signal processor may comprise an error signal minimisation process for the control signal. Under certain conditions and with certain types of controllers, the interference compensation signal may be permanently slightly offset (in amplitude and/or phase) from the actual interference signal as it occurs in the receive chain. In order to eliminate this permanent offset, the controller should have a suitable configuration, such as a controller comprising an error signal minimisation processor.

It would be further desirable to take advantage of the capabilities offered by digital signal processing. In order to address this concern, the control signal processor may be digital and operate at an intermediate frequency. The interference canceller may further comprise a digital-to-analogue converter between the control signal processor and the vector modulator, or, alternatively, between the variable attenuator and the variable phase shifter. The intermediate frequency is relative to a base band frequency and a radio frequency of the transceiver. The control signal processor may employ digital signal processing for a number of tasks, in particular signal analysis, signal comparison, cross-correlation etc. These are tasks that are often cheaper and easier to implement as digital functions, rather than as analogue circuits. The analogue-to-digital converters serve as interfaces between the digital signal processor and the analogue parts of the interference canceller. The digital control signal processor may be operated at an intermediate frequency that is sufficient for achieving a satisfactory response time for the control loop.

It would be further desirable to match the interference compensation signal to the cross-talk transmission noise/IMD, not only with respect to a primary amplitude and phase, but also with respect to the spectrum thereof, or at least a part of the spectrum. In order to address this concern, the filter may be adaptive and the interference canceller may further comprise a filter characteristic corrector arranged to adapt the filter characteristic for improving a gain and/or phase characteristic of said interference compensation signal. An adaptive filter allows approximating the spectrum of the interference compensation signal to the spectrum of the cross-talk transmission noise/IMD.

The teachings disclosed herein also relate to an antenna array that comprises a plurality of antenna elements and at least one transceiver comprising an interference canceller as defined above. Some types of antenna arrays have a large number of transceivers, providing high flexibility to the antenna array, especially for features such as beam steering and beam forming. Each transceiver requires a diplexer of its own, because the signals transmitted and received by the various transceivers are independent from each other. The diplexers have to be precise and exactly tuned, which makes them expensive. The interference canceller as described above allows the diplexers to be less precise. The reduced performance requirements may lead to significant savings for an antenna array having a large number of transceivers, for example eight, sixteen, or even more. In many cases it is expected that the cost for the additional structures, in particular the interference canceller, are not as high as the savings achieved with the lower grade diplexers, thus yielding a net savings for the antenna array. Diplexers are also quite bulky components, compared to the remainder of the components. A lower grade diplexer may require less space than a high grade diplexer. For an antenna array this may add up to significant saving in space. A diplexer that has less stringent requirements for the frequency roll-off usually has less insertion loss, to the benefit of other components of the transceiver, in particular a transmit power amplifier and a receive amplifier.

The teachings disclosed herein also relate to a computer-program product embodied on a computer readable medium and comprising executable instructions for the manufacture of the interference canceller as described above.

The teachings disclosed herein further relate to a method for interference cancellation between a transmit chain and a receive chain of a transceiver. The method comprises tapping a signal at a transmit chain tap to obtain a tapped signal, processing the tapped signal within an interference processing path between the transmit chain and the receive chain to obtain an interference compensation signal, wherein processing comprises filtering the tapped signal in a similar manner to a filtering action of a transmit-to-receive interference path of the transceiver, coupling the interference compensation signal with the receive chain. The method provides an active transmit noise/IMD cancellation that complements the action of the diplexer, rather than substituting the diplexer altogether.

It would be desirable to adapt the processing of the tapped signal in response to varying conditions, such as temperature drift of the diplexer. In order to address this concern the method may further comprise determining, based on a signal on the transmit chain and a signal on the receive chain, a control signal arranged to influence the processing of the tapped signal.

It would be desirable to know the original interference compensation signal for improved control thereof and/or improved tracking of the transmit noise/IMD. In order to address this concern, the method may further comprise feeding the interference compensation signal from the action of processing of the tapped signal back to the action of determining the control signal.

It would be further desirable to estimate the transmit IMD directly from the payload signal on the transmission chain. In order to address this concern, the action of determining the control signal may comprise applying a transmit chain non-linearity model and an equivalent receive band filter to the signal on the transmit chain.

It would be further desirable to achieve improved error-vector magnitude for the transmitter whilst also making the degree of cancellation achieved higher. In order to address this concern, the filter may be adaptive and the method may further comprise adapting the filter for improving a gain and/or phase characteristic of the interference compensation signal.

The teachings disclosed herein further relate to a computer-program product comprising instructions that enable a processor to carry out the method as described above.

These and other aspects of the invention will be apparent from, and elucidated with reference to, the embodiment(s) described herein after.

DETAILED DESCRIPTION OF THE EMBODIMENTS

For a complete understanding of the present invention and the advantages thereof, reference is now made to the following detailed description taken in conjunction with the Figures.

It should be appreciated that the various aspects of the invention discussed herein are merely illustrative of the specific ways to make and use the invention and do not therefore limit the scope of invention when taken into consideration with the claims and the following detailed description. It will also be appreciated that features from one embodiment of the invention may be combined with features from another embodiment of the invention.

Figure 1:
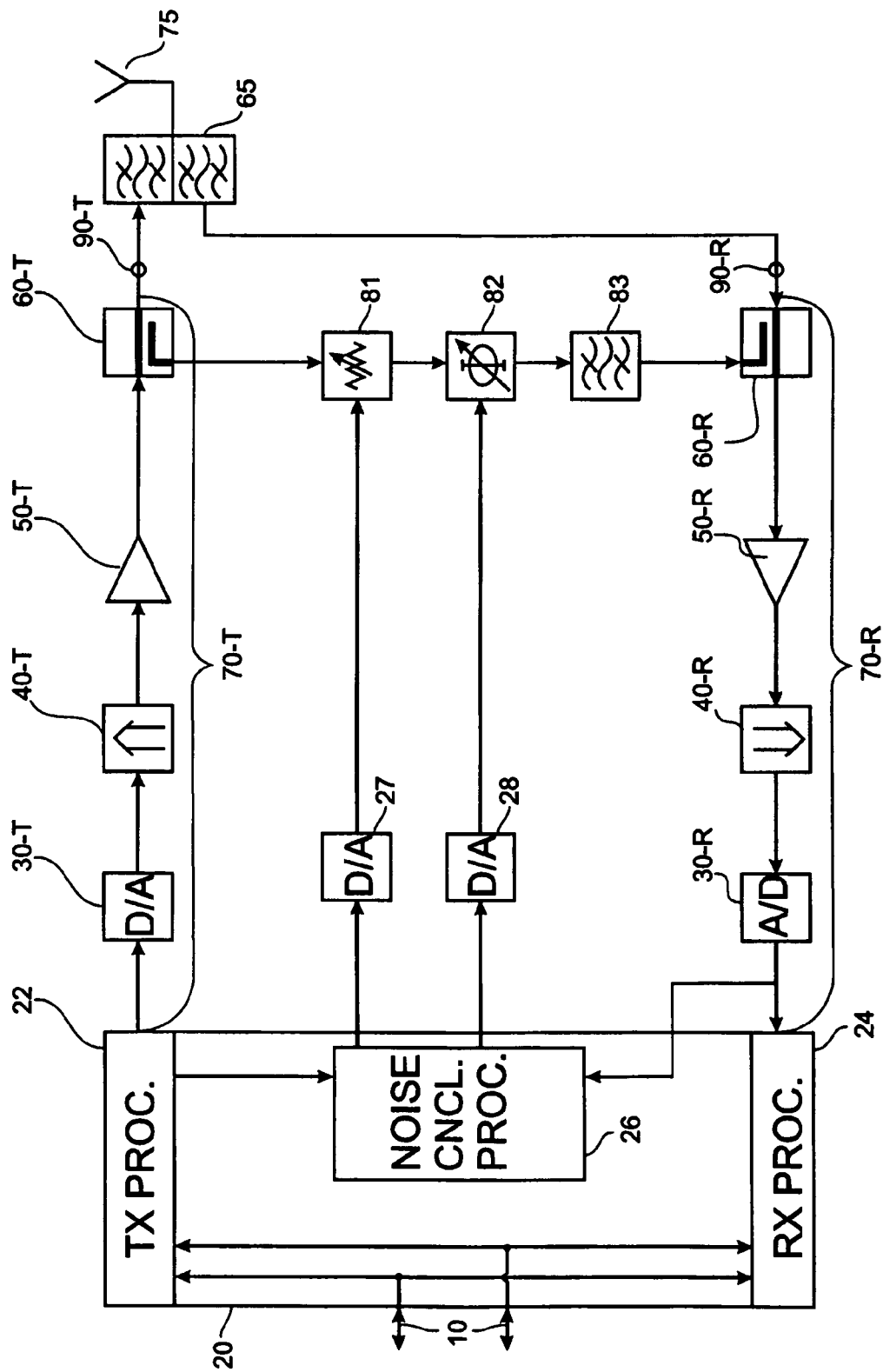
FIG. 1 shows a schematic block diagram of a transceiver comprising an interference canceller according to the teachings disclosed herein.

FIG. 1 shows a schematic block diagram of a transceiver. The transceiver comprises a transmitter that is illustrated in the upper part of FIG. 1, and a receiver that is illustrated in the lower part of FIG. 1. The transceiver has an interface for exchanging input/output data 10 with components external to the transceiver.

In the transmit direction, the transceiver comprises a transmit signal processor 22 that adapts a signal for subsequent transmission. Transmit signal processor 22 may comprise a unit for crest factor reduction (CFR) and/or a unit for digital predistortion (DPD). The transmit signal processor may be part of a digital signal processor (DSP) 20, or it may be implemented by means of a digital signal processor. The transmit signal processor 22 is connected to a digital-to-analogue converter 30-T. The analogue signal issued by the digital-to-analogue converter 30-T is passed on to an up-converter 40-T, which may also comprise a filter. The up-converter 40-T converts the transmit signal e.g. from an intermediate frequency (IF) to the radio frequency (RF) at which the signal is to be transmitted. A transmit amplifier 50-T is provided to amplify the signal intended for transmission. The amplified signal 90-T passes a transmit chain tap 60-T, the function of which will be explained below. A diplexer 65, or duplex filter, filters the amplified signal 90-T so that the amplified signal 90-T respects a required spectral mask. After having passed the diplexer 65 the amplified and filtered transmit signal is passed to an antenna element 75. The digital-to-analogue converter 30-T, the up-converter 40-T, the amplifier 50-T, and the transmit chain tap 60-T are all part of a transmit chain 70-T.

In the receive direction, the transceiver comprises a receive chain coupler 60-R, a receive amplifier 50-R, a down-converter 40-R, and an analogue-to-digital converter 30-R. The receive amplifier 50-R is connected to an output of the diplexer 65 to receive a receive signal 90-R from the diplexer 65. The receive amplifier 50-R is usually a low noise amplifier (LNA). The down-converter 40-R converts the received signal from the radio frequency at which the signal was received by the antenna element 75 down to e.g. an intermediate frequency (IF). The receive chain coupler 60-R, the receive amplifier 50-R, the down-converter 40-R, and the analogue-to-digital converter 30-R are part of a receive chain 70-R. The digital output of the digital-to-analogue converter 30-R is transmitted to a receive signal processor 24 for subsequent signal processing. The receive signal processor may be part of the same digital signal processor 20 mentioned above, or implemented on another digital signal processor.

The function of the diplexer 65 is filtering the transmit signal 90-T and the receive signal 90-R according to intended transmit and receive frequency bands. Another function of the diplexer 65 is to provide a connection between the antenna element, the transmit chain, and the receive chain. The diplexer is to direct the transmit signal from the transmit chain input port to the antenna element port, and to direct the receive signal from the antenna element port to the receive chain output port. An ideal diplexer 65 would not attenuate the transmit signal and the receive signal on these intended connections, but provide very high attenuation between the transmit chain port and the receive chain port. A high attenuation, or good insulation, between the transmit chain port and the receive chain port prevents cross-talk, or interference, from the transmit chain to the receive chain. In contrast to ideal diplexers, real diplexers add an insertion loss to the transmit and receive chains. Furthermore, real diplexers cannot provide an ideal isolation between the transmit chain port and the receive chain port.

Besides the interference that is transmitted from the transmit chain to the receive chain within the diplexer 65, another source of interference is the part of the circuit between the diplexer 65 and the antenna element 75. For example, non-linearities in this part of the circuit may cause the creation of intermodulation distortions (IMD) upon excitation by the amplified transmit signal 90-T. Some of these intermodulation distortions may fall into the receive frequency band so that they are passed, together with the receive signal 90-R, on to the receive chain 70-R without being substantially filtered by the diplexer 65.

The transceiver shown in FIG. 1 comprises an interference canceller that assists and complements the action of the diplexer 65. The interference canceller comprises the transmit chain tap 60-T, a variable attenuator 81, a variable phase shifter 82, a band pass filter 83, and the receive chain coupler 60-R. These components form an interference signal processing path. By means of the transmit chain tap 60-T the interference signal processing path is provided with a sample of the transmit signal 90-T at the output of the transmit amplifier 60-T. The influence of transmit chain tap 60-T on the transmit signal 90-T is virtually negligible, i.e. the amount of signal power extracted by transmit chain tap 60-T is very small compared to the power of the transmit signal 90-T itself The tapped signal contains the noise and residual interference intermodulation distortion which needs to be cancelled in the receiver path. The variable attenuator 81 and the variable phase shifter 82 modify the interference compensation signal with respect to amplitude and phase. The gain and phase weighted signal is fed to the filter 83. This filter 83 is shown in FIG. 1 as a bandpass filter, however it could also be a high-pass filter or a low-pass filter, depending upon the orientation of the transmit and receive bands in the frequency-division duplex scheme for which the interference canceller is being designed, and other system characteristics (e.g. adjacent interferers). This filter 83 has similar or identical performance characteristics to that of the receive portion of the diplexer 65. This provision ensures that only (or largely) the transmitter noise falling into the receiver band is passed to the receive chain coupler 60-R, and this in a similar form. The variable phase shifter ensures that that the interference compensation signal is passed to the receive chain coupler in the form of an anti-phase cancelling signal, such that vector cancellation of the transmit noise and IMD occurs in the receive chain coupler 60-R.

The amount of the attenuation achieved by variable attenuator 81 and the amount of phase shift achieved by variable phase shifter 82 are illustrated as being controllable in FIG. 1. However, in a simple implementation it may be sufficient to choose fixed predetermined values for the attenuation and the phase shift. Referring back to FIG. 1, control of the amount of attenuation and phase shift is ensured by a noise cancellation processor 26. The noise cancellation processor 26 receives a sample of the transmit signal from transmit signal processor 22, and a sample of the receive signal as fed to the receive signal processor 24. The noise cancellation processor 26 compares the samples of the transmit signal and of the receive signal. By determining how much of the transmit signal is detectable in the receive signal, the performance of the diplexer 65 in combination with the interference signal processing path can be estimated. The noise cancellation processor 26 adjusts the control signals for the variable attenuator 81 and the variable phase shifter 82 such that the vector cancellation occurring in the receive chain coupler 60-R is optimized. Two digital-to-analogue converters 27, 28 convert the digital control signals output by the noise cancellation processor 26 to analogue signals for driving the variable attenuator 81 and the variable phase shifter 82. The noise cancellation processor 26 may be part of the digital signal processor 20 mentioned above.

Figure 2:
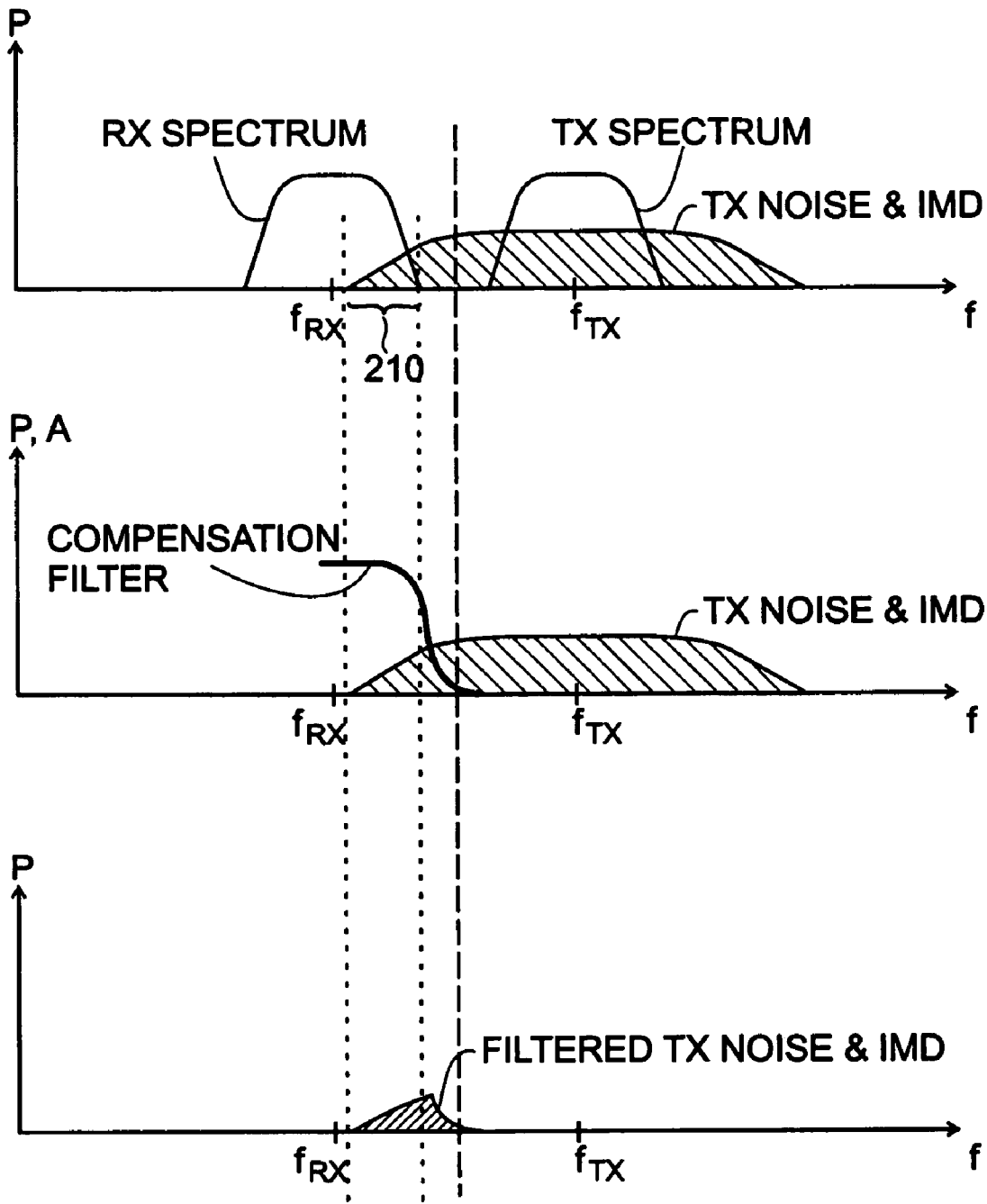
FIG. 2 shows three diagrams in the frequency domain for illustrating an aspect of the teachings disclosed herein.

FIG. 2 illustrates the influence of the filter 83 in the interference signal processing path. The upper of the three diagrams in FIG. 2 shows the spectrum of the receive signal (RX SPECTRUM) and the spectrum of the transmit spectrum (TX SPECTRUM). The spectrum of the receive signal is positioned at a receive frequency $f_{RX}$, while the spectrum of the transmit signal is positioned at a transmit frequency $f_{TX}$. A dashed line indicates the boundary between the transmit band and the receive band. The upper diagram in FIG. 2 also shows, in a schematic manner, the spectrum of the transmit noise and the transmit intermodulation distortion (TX NOISE & IMD). The transmit noise and intermodulation distortion spectrum extends over a significantly larger frequency range than the transmit signal itself. Indeed, the transmit noise and intermodulation distortion also extends into the frequency range reserved for the receive signal, and in particular into an interference affected frequency range 210. The receive signal will be more or less disturbed due to the interference observed in interference affected frequency range 210.

The second diagram in FIG. 2 shows the spectrum of the transmit noise and intermodulation distortion, as well as the frequency response of filter 83 (COMPENSATION FILTER). The frequency response of filter 83 is similar or identical to that of the receive portion of the diplexer 65. In FIG. 2, only the right (higher frequency) part of the frequency response is illustrated. As mentioned above, the filter 83 may be a bandpass filter, a low-pass filter, or high-pass filter, or any other kind of filter.

The lower diagram in FIG. 2 shows the effect of the filter 83 on the spectrum of the transmit signal (including transmit noise and intermodulation distortion), i.e. by and large the spectrum of the interference compensation signal. The diplexer 65 has a frequency response similar to the frequency response of filter 83. Therefore, the spectrum of the interference component in the receive signal and the spectrum of the interference compensation signal are similar to each other. It is now sufficient to adjust the amplitude and the phase of the interference compensation signal to obtain vector cancellation of the interference compensation signal and the interference component in the receive signal.

Figure 3:
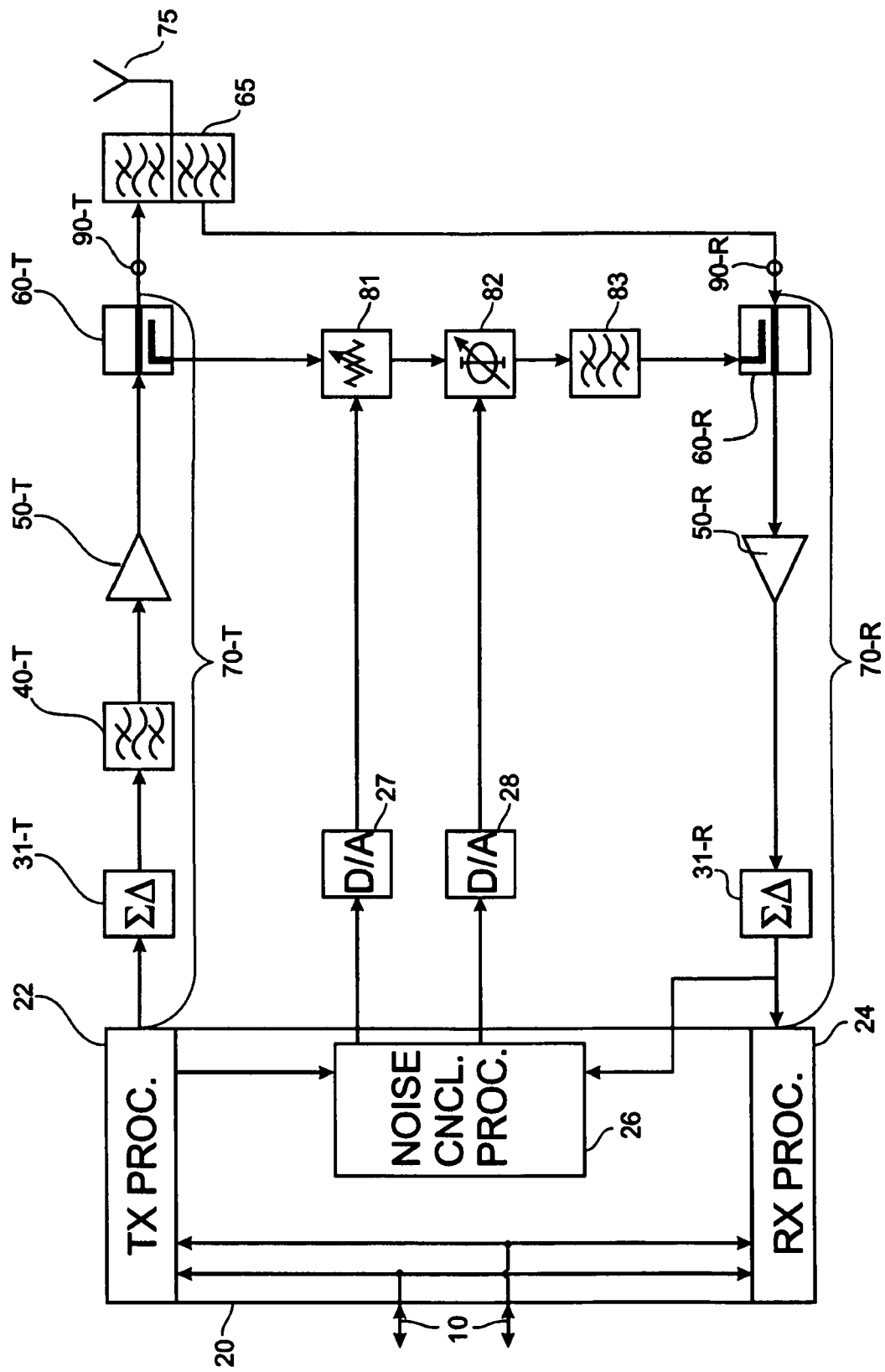
FIG. 3 shows a schematic block diagram of a transceiver comprising delta-sigma modulators and an interference canceller according to the teachings disclosed herein.

FIG. 3 shows a block diagram of a transceiver similar to the transceiver shown in FIG. 1. The transceiver shown in FIG. 3 employs delta-sigma modulators 31-T and 31-R instead of digital-to-analogue converter 30-T and analogue-to-digital converter 30-R. Delta-sigma modulator 31-T is a delta-sigma digital-to-analogue converter. Delta-sigma modulator 31-R is a delta-sigma analogue-to-digital converter. The delta-sigma modulators 31-T, 31-R also replace the up-converter 40-T in the transmit chain 70-T and the down-converter 40-R in the receive chain 70-R. The transmit chain of the transceiver in FIG. 3 comprises a transmit bandpass filter 41-T, primarily for filtering the out-of-band quantization noise generated by the delta-sigma modulator 31-T.

Figure 4:
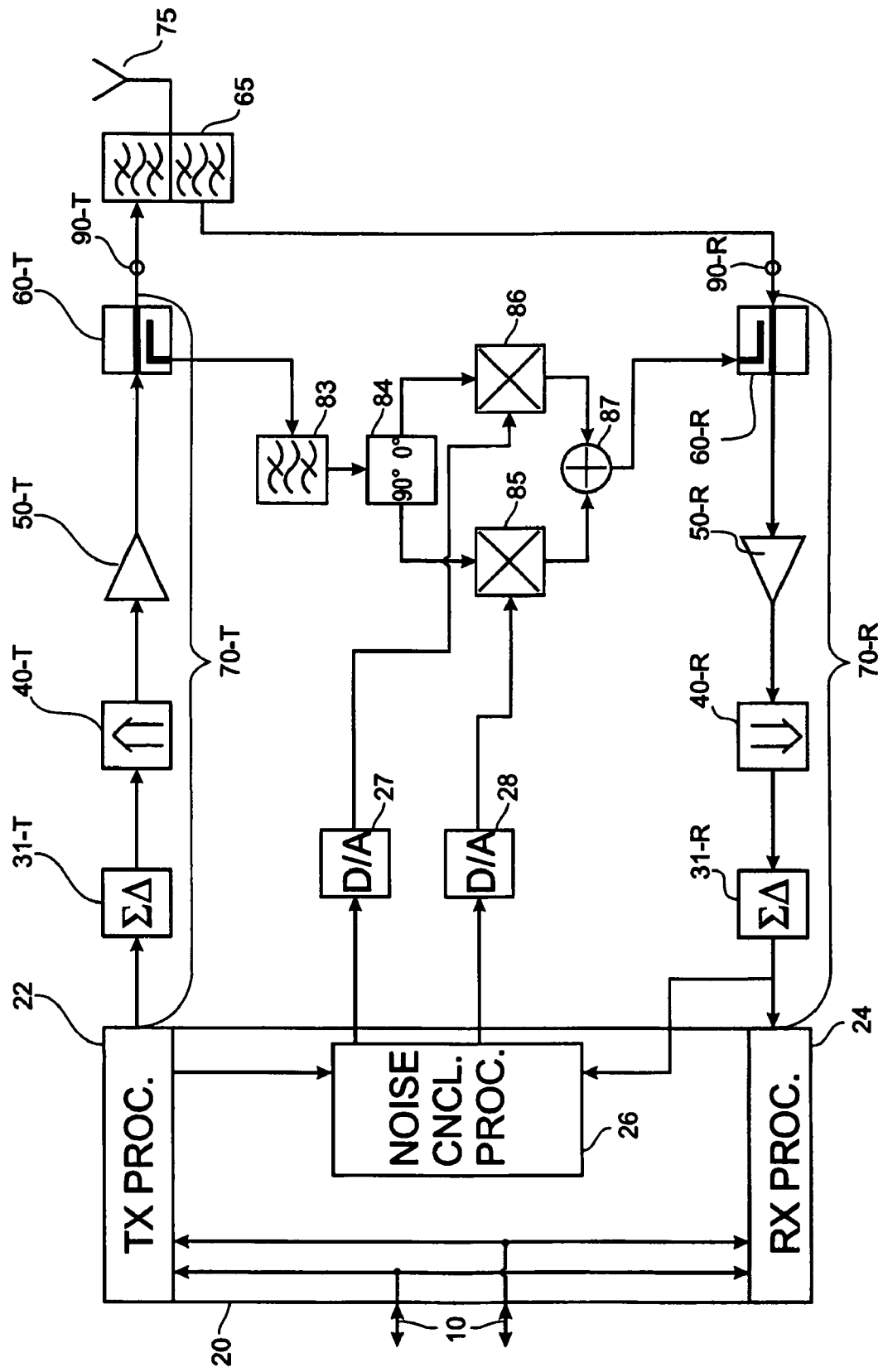
FIG. 4 shows a schematic block diagram of a transceiver comprising an interference canceller according to the teachings disclosed herein and having an alternative structure.

FIG. 4 shows an alternative form of the interference canceller. In this case, a vector modulator is shown in place of the amplitude and phase (polar) control system of FIG. 1. A vector modulator has the advantage that it is simpler (typically) to provide a full 360 degrees of phase control and careful phasing of the interference signal processing path (e.g. by careful choice of the track lengths on the printed circuit board) is not typically required. The vector modulator comprises phase splitter 84, two multipliers 85, 86, and an adder 87. The multiplication factors applied by the multipliers 85, 86 can be adjusted by means of the noise cancellation processor 26 and the digital-to-analogue converters 27, 28. The filter 83 is the same as before. The filter 83 may be upstream or downstream of the vector modulator.

Figure 5:
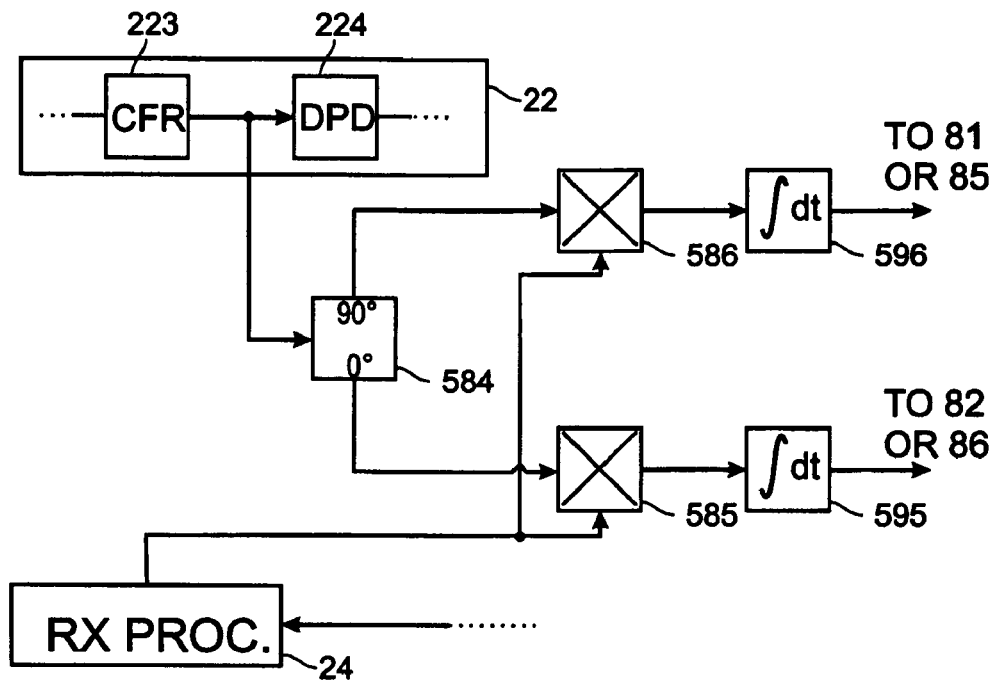
FIG. 5 shows a schematic block diagram of a detail of an interference canceller according to the teachings disclosed herein.

FIG. 5 shows a simple implementation of the noise cancellation processor 26. This is essentially a quadrature correlator with integrators at the outputs, to feed the control elements (either polar: gain/phase or vector modulator: I/Q). The signals are assumed to be fed to the correlator at a digital intermediate frequency, although it is also possible to undertake the same form of processing at baseband (or indeed in the analogue domain at an intermediate frequency or at RF). The transmit signal is fed to the correlator from a point in the transmitter processing 22 after it has undergone crest factor reduction (CFR) 223 and prior to it undergoing digital predistortion (DPD) 224. The reason for this choice is that the signal it needs to correlate with (the residual transmit energy in the receive signal path) will have (ideally) the same characteristics, since the predistortion 224 will have (largely) counteracted the non-linearity of the power amplifier 50-T.

The signal taken after the crest factor reduction 223 is fed to a phase splitter 584 having outputs of 0 degrees phase shift and of 90 degrees phase shift, thus yielding an I/Q representation of the transmit signal tapped between the crest factor reduction 223 and the digital predistortion 224. The I/Q representation is fed to the quadrature modulator, comprising two multipliers 585, 586. The signals representing the multiplication results are fed to integrators 595, 596, respectively. The outputs of the integrators 595, 596 are then fed as control signals to the variable attenuator 81 and the variable phase shifter 82, respectively, or to the multipliers 85, 86 of the vector modulator as shown in FIG. 3.

The operation of the control system, as shown in FIG. 5, aims to minimize the amount of main lobe transmit signal energy present in the receiver path (i.e. it does not directly aim to minimize the amount of noise/IMD present). The assumption inherent in its operation is that minimizing the main transmit signal energy will, as a consequence, also minimize the noise/IMD energy, which is the main purpose of the interference canceller. It assumes therefore that there is still sufficient correlation between the main transmit signal and its associated noise/IMD even after both have been processed by the duplex filter 65. Whilst this correlation is likely to degrade due to the actions of the filter, it will not be destroyed entirely, and sufficient performance should still be available from the system. If higher performance is required, additional signal processing is necessary as will be discussed below.

Figure 6:
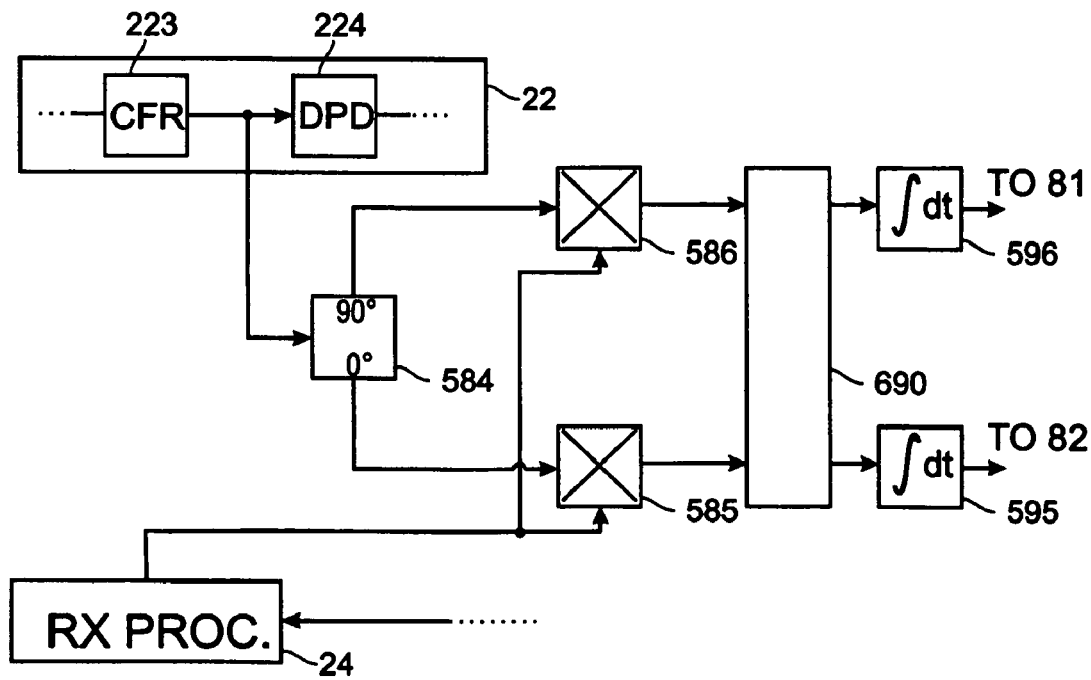
FIG. 6 shows a schematic block diagram of a detail of an interference canceller according to an alternative implementation of the teachings disclosed herein.

It is possible to show that the same (simple) correlation processing will work successfully for both polar and vector control systems (although it is sub-optimal, from an acquisition perspective, in the polar case). The sub-optimal behaviour in the polar case can be addressed by a vector-to-polar converter 690, as shown in FIG. 6. The vector (rectangular) to polar converter 690 implements the following functions:

$$\text{Gain\_control} = \text{SQRT}(I^2 + Q^2)$$

$$\text{Phase\_control} = \text{TAN}^{-1}(Q/I)$$

Note that the vector-to-polar converter 590 can also be placed following the integrators, rather than prior to them, without altering the functionality of the system. Note that other forms of controller can also be utilised (other than the simple integral controller shown in FIG. 5 and FIG. 6), for example a proportional-plus-integral controller. Other forms of controller will impact the pull-in and tracking performance of the system. However, the fundamental concept of the teachings disclosed herein are not affected by the choice of the controller.

Figure 7:
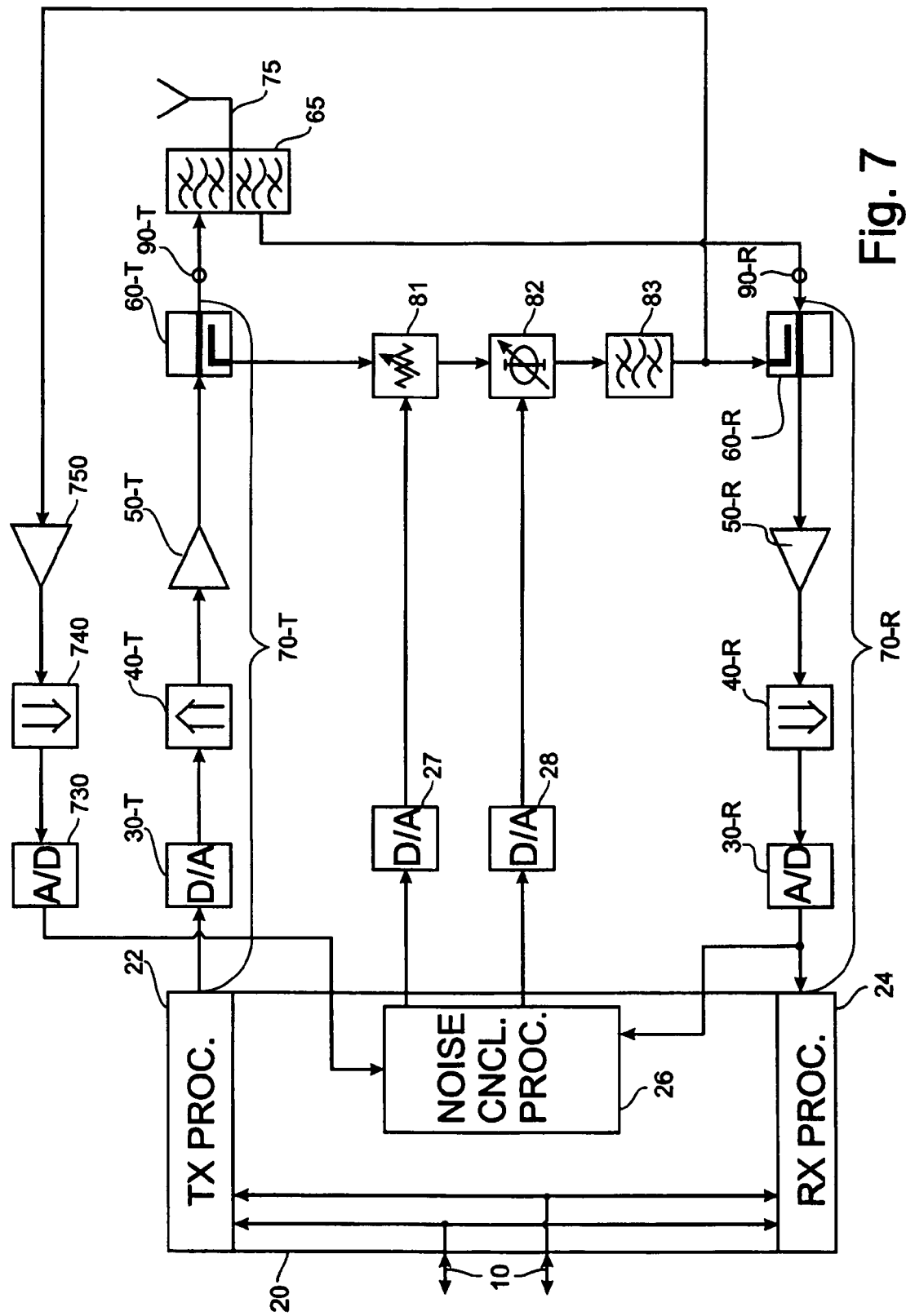
FIG. 7 shows a schematic block diagram of a transceiver comprising an interference canceller according to a further possible implementation of the teachings disclosed herein.

FIG. 7 shows how an additional down-conversion chain can be used to improve the correlation process which controls the transmit noise/IMD cancellation. As noted above, the system shown in the earlier figures does not directly correlate the transmit noise/IMD falling in the receive band with 'uncorrupted' transmit noise/IMD, rather it relies on the correlation of the main transmit signal itself and implies that this is well correlated with the noise/IMD (despite modification of both by the diplexer 65). In FIG. 7, this assumption is not made and a separate down-conversion chain, purely for the interference cancellation signal, is employed. This approach trades added complexity for improved cancellation performance and may be economic in some cases, since it has the potential to significantly reduce the complexity (and hence size, cost and loss) of the duplex filter.

The down-conversion chain in FIG. 7 comprises a low noise amplifier 750, a down-converter 740 and an analogue-to-digital converter 730. The components of the down-conversion chain are basically similar to the components in the receive path, such as the receive amplifier 50-R, the down-converter 40-R and the analogue-to-digital converter 30-R (or the delta-sigma modulator 31-R). The down-conversion chain taps the interference compensation signal between the filter 83 and the receive chain coupler 60-R of the interference signal processing path, so that the interference compensation signal can be observed by the noise cancellation processor 26. The noise cancellation processor 26 determines, to which extent the receive signal at the output of the analogue-to-digital converter 30-R (or the delta-sigma converter 31-R) is correlated to the interference compensation signal. The vector cancellation can usually be assumed to function properly, if the correlation between these two signals is weak, because then the interfering transmit noise/IMD and the interference compensation signal have effectively cancelled each other. In the contrary case, it can be assumed that the vector cancellation is not yet optimal and the noise cancellation processor 26 needs to modify the control signals for the interference signal processing path.

Figure 8:
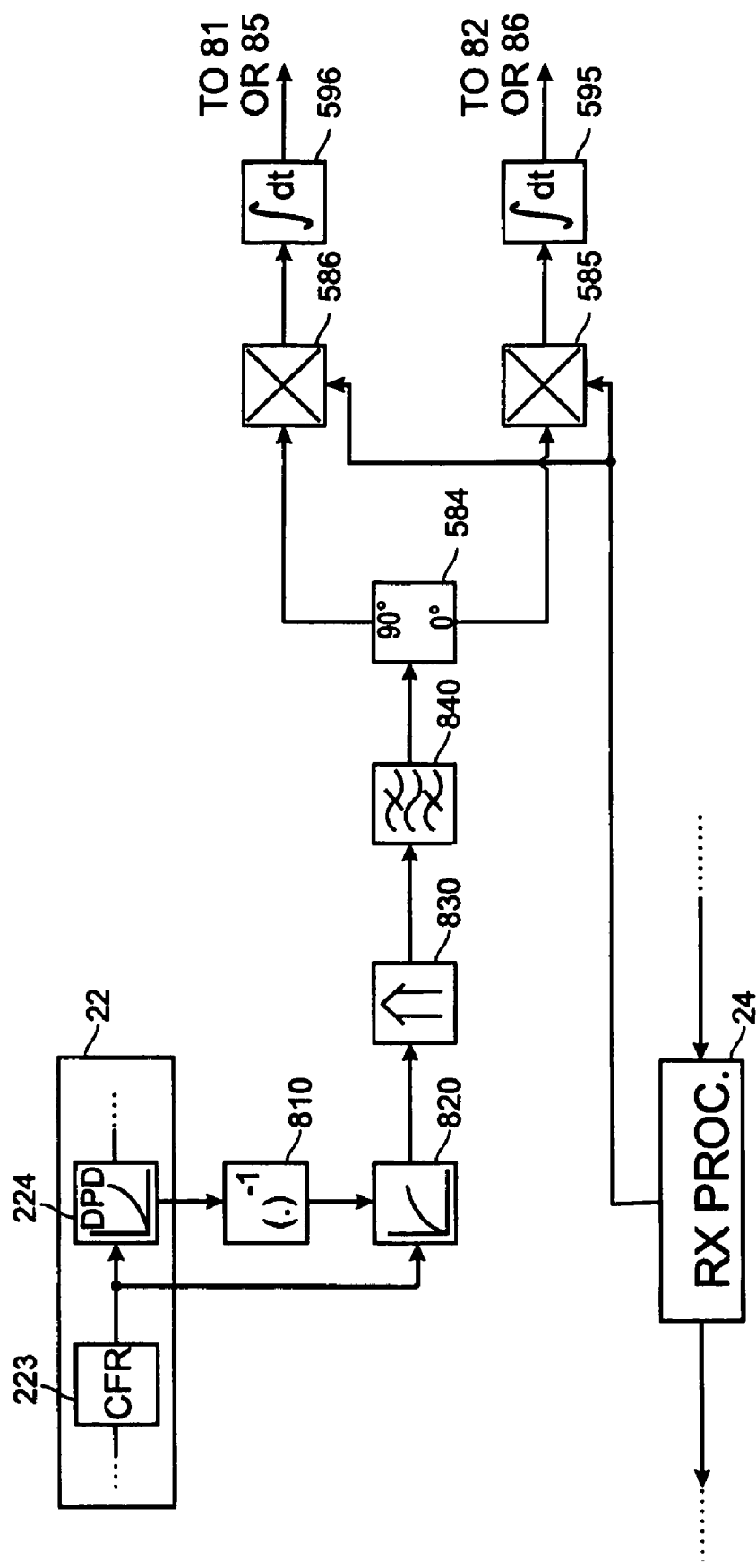
FIG. 8 shows a schematic block diagram of a generator for a noise reference signal used in a further possible implementation of the teachings disclosed herein.

FIG. 8 shows a further option for generating a reference signal for the transmit IMD (but not for the transmit noise) in the digital signal processor 20 and use this (internally to the DSP) for correlation with the receive signal. This removes the need for an added down-conversion chain but relies on the accurate generation (and filtering) of an appropriate IMD signal. Fortunately, such a signal is relatively easy to generate, since the transmit chain will already be continuously generating an inverse of the required characteristic as a consequence of its digital predistortion processing. All that is then required is to invert this predistortion characteristic, to form a model of the amplifiers distortion characteristic, and then utilize this model to generate the required transmit IMD. This IMD can be filtered to leave just that present in the receive band. This signal is then used as a reference signal in the correlation processing. Such an approach is illustrated in FIG. 8. Note that the filter 840 shown in FIG. 8 signifies a filter of equivalent bandwidth and relative frequency position (to that of the transmit band) but placed at the digital intermediate frequency used within the system. Note also that it is possible to perform equivalent processing directly at baseband, without the need for a digital intermediate frequency.

The reference signal generator shown in FIG. 8 taps a version of the transmit signal at a point between crest factor reduction 223 and digital predistortion 224. The reference signal generator also obtains a copy of the digital predistortion model, or is granted access to the model's parameters and/or values. The digital predistortion model is inverted by means of inverter 810 which may be a function implemented in software. The inversion of the predistortion model yields a non-linearity model 820 of the non-linearity of the power amplifier 50-T. The tapped transmit signal is processed according to the non-linearity model 820. The transmit signal deformed by the non-linearity model 820 is fed to an up-converter 830 and to the bandpass filter 840 mentioned above. The bandpass filter 840 provides the desired reference signal which is then fed to the quadrature correlator as already described above with reference to FIG. 5.

Note that cancellation could be performed at a variety of points within the receive chain: at RF, IF or baseband (both analogue and digital).

While various embodiments of the present invention have been described above, it should be understood that they have been presented by way of example, and not limitation. It will be apparent to persons skilled in the relevant arts that various changes in form and detail can be made therein without departing from the scope of the invention. In addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modelling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the present invention may include methods of providing the apparatus described herein by providing software describing the apparatus and subsequently transmitting the software as a computer data signal over a communication network including the Internet and intranets.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. An interference canceller between a transmit chain and a receive chain of a transceiver, the transceiver comprising a diplexer between the transmit chain and the receive chain, the interference canceller comprising a transmit chain tap, a receive chain coupler for coupling an interference compensation signal into the receive chain, and an interference signal processing path between the transmit chain tap and the receive chain coupler, the interference signal processing path comprising a filter having filtering characteristics similar or corresponding to the filtering characteristic of a receive portion of said diplexer.

2. The interference canceller of claim 1, wherein the transmit chain is configured to be operable at a transmit frequency band defined by a transmit channel, and wherein the filtering characteristic of said filter allows transmission of transmission noise falling in a frequency band outside the transmit channel.

3. The interference canceller of claim 1, wherein the interference signal processing path further comprises a vector modulator or a variable attenuator and a variable phase shifter.

4. The interference canceller of claim 3, further comprising a control signal processor arranged to determine control signals for, and coupled to, the vector modulator or the variable attenuator and the variable phase shifter.

5. The interference canceller of claim 4, wherein the control signal processor comprises a quadrature correlator arranged to receive a signal on the transmit chain and a signal on the receive chain of the transceiver.

6. The interference canceller of claim 4, further comprising a feedback path between the interference signal processing path and the control signal processor for providing the interference compensation signal to the control signal processor.

7. The interference canceller of claim 5, wherein the control signal processor comprises a transmit chain non-linearity model and an equivalent receive band filter, the signal on the transmit chain being applied to the transmit chain non-linearity model.

8. The interference canceller of claim 4, wherein the control signal processor comprises an error signal minimisation process for the control signal.

9. The interference canceller of claim 4, wherein the control signal processor is digital and operates at an intermediate frequency, and wherein the interference canceller further comprises a digital-to-analogue converter between the control signal processor and the vector modulator or the variable attenuator and the variable phase shifter.

10. The interference canceller of claim 1, wherein the filter is adaptive and wherein the interference canceller further comprises a filter characteristic corrector arranged to adapt the filter characteristic for improving a gain and/or phase characteristic of said interference compensation signal.

11. An antenna array, comprising a plurality of antenna elements and at least one transceiver, the transceiver comprising an interference canceller of claim 1.

12. A computer-program product embodied on a computer readable medium and comprising executable instructions for the manufacture of the interference canceller of claim 1.

13. A method for interference cancellation between a transmit chain and a receive chain of a transceiver, comprising:
 tapping a signal at the transmit chain to obtain a tapped signal,
 processing the tapped signal within an interference processing path between the transmit chain and the receive chain to obtain an interference compensation signal, wherein processing comprises filtering the tapped signal in a similar or corresponding manner to a filtering action of a transmit-to-receive interference path of the transceiver,
 coupling the interference compensation signal with the receive chain.

14. The method of claim 13, further comprising determining, based on a signal on the transmit chain and a signal on the receive chain, a control signal arranged to influence said processing of the tapped signal.

15. The method of claim 14, further comprising feeding back the interference compensation signal from said action of processing of the tapped signal to said action of determining the control signal.

16. The method of claim 14, wherein said action of determining said control signal comprises applying a transmit chain non-linearity model and an equivalent receive band filter to said signal on the transmit chain.

17. The method of claim 14, wherein said filter is adaptive and the method further comprises adapting the filter characteristic for improving a gain and/or phase characteristic of said interference compensation signal.

18. A computer-program product comprising instructions that enable a processor to carry out the methods according to claim 14.

* * * * *